(12) United States Patent
Akamatsu

(10) Patent No.: US 7,456,978 B2
(45) Date of Patent: Nov. 25, 2008

(54) SHAPE MEASURING APPARATUS

(75) Inventor: Masaru Akamatsu, Kobe (JP)

(73) Assignee: Kabushiki Kaisha Kobe Seiko Sho, Hyogo (JP)

( * ) Notice: Subject to any disclaimer, the term of this patent is extended or adjusted under 35 U.S.C. 154(b) by 81 days.

(21) Appl. No.: 11/274,200

(22) Filed: Nov. 16, 2005

(65) Prior Publication Data

US 2006/0109484 A1    May 25, 2006

(30) Foreign Application Priority Data

Nov. 24, 2004   (JP) .............................. 2004-339213

(51) Int. Cl.
*G01B 11/04*   (2006.01)
(52) U.S. Cl. ........................... 356/638; 356/635
(58) Field of Classification Search ......... 356/612–613, 356/621, 638–640
See application file for complete search history.

(56) References Cited

U.S. PATENT DOCUMENTS 3,874,798 A * 4/1975 Antonsson et al. .......... 356/638
3,901,606 A * 8/1975 Watanabe et al. ........... 356/638
3,947,129 A * 3/1976 Wiklund ..................... 356/638
4,021,119 A * 5/1977 Stauffer ...................... 356/638
4,417,147 A * 11/1983 Faville ................... 250/559.14
4,576,482 A * 3/1986 Pryor .......................... 356/612
6,700,671 B2 * 3/2004 Akishiba .................... 356/638

FOREIGN PATENT DOCUMENTS

| JP | 60-183507 | 2/1984 |
| JP | 7-332933 | 6/1994 |
| JP | 2003-167212 | 11/2001 |

* cited by examiner

*Primary Examiner*—Gregory J Toatley, Jr.
*Assistant Examiner*—Juan D Valentin
(74) *Attorney, Agent, or Firm*—Reed Smith LLP; Stanley P. Fisher, Esq.; Juan Carlos A. Marquez, Esq.

(57) ABSTRACT

A shape measuring apparatus includes a point light source including a white light-emitting diode, a collimator lens for forming a parallel beam as a result of causing light emitted from the point light source to be incident upon the collimator lens, a telecentric lens device, including two-side telecentric optics or object-side telecentric optics, for being irradiated with the light that has passed an object to be measured from the collimator lens, and an image sensor for projecting thereon an image of the object produced by the light that has passed through the telecentric lens device.

2 Claims, 5 Drawing Sheets

SEMICONDUCTOR WAFER

SHAPE MEASURING APPARATUS

BACKGROUND OF THE INVENTION

1. Field of the Invention

The present invention relates to a shape measuring apparatus.

2. Description of the Related Art

An optical external dimension measuring apparatus is available as a shape measuring apparatus. The optical external dimension measuring apparatus measures the shape of an object on the basis of an image (that is, a project image) of the object that is projected onto an image sensor by directing a parallel beam towards the image sensor beyond the object. The optical external dimension measuring apparatus comprises optics including a projector which includes an optical source, a bar lens, and a lens, and an optical receiver which includes a cylindrical lens and an image sensor.

An object to be measured that is placed between the projector and the optical receiver has, like a rod, a short length in the direction of an optical axis in which a parallel beam extends (that is, a short length in the optical axis direction of the object to be measured).

However, it is difficult to irradiate the object with a light beam that is exactly parallel. When the shape of an object having a long length in the direction of the optical axis is measured, the light from a lens is scattered at many points at a surface of the object along the direction of the optical axis. Therefore, an edge of an image of the object projected onto the image sensor is no longer distinct, thereby increasing the extent of blurring of the image. Consequently, it becomes difficult to identify the true edge, thereby reducing the precision with which the shape of the object is measured.

In the related shape measuring apparatus, a monochromatic (single-wavelength) light-emitting diode (LED) having a relatively excellent coherence is used as the optical source (light source). However, when an object to be measured has a long length in the direction of the optical axis, a projection optical path is long. Therefore, when the coherence is excellent, the number of points where a parallel beam is diffracted is increased, as a result of which a number of diffraction fringes (that is, interference fringes) are produced one above another near and along the true edge of the image of the object that is projected on the image sensor. Consequently, an image processing operation for preventing erroneous detection of the true edge becomes complicated, and a load on an image processing system is increased, thereby reducing the precision with which the shape is measured and increasing the time required for the measurement.

In the above-described related shape measuring apparatus, a flash lamp is also used as the light source. The flash lamp (xenon flash lamp) is a white light source exhibiting no coherence unlike an LED. In terms of size, however, it is difficult to obtain a point light source required to form a light beam that is close to an exactly parallel beam to the greatest degree possible. As the size of the light source increases, the extent of blurring of the edge of the image of the object is increased. In addition, the flash lamp has poor durability.

SUMMARY OF THE INVENTION

Accordingly, it is an object of the present invention to provide a shape measuring apparatus which, even if an object to be measured has a long length in an optical axis direction in which a parallel beam extends, can produce a good image of the object having little blurring of an edge of the image at an image sensor and having a small number of diffraction fringes near the edge.

A shape measuring apparatus according to the present invention has the following basic structure.

The shape measuring apparatus comprises a point light source including a white light-emitting diode, a collimator lens for forming a parallel beam as a result of causing light emitted from the point light source to be incident upon the collimator lens, a telecentric lens device, including two-side telecentric optics or object-side telecentric optics, for being irradiated with the light that has passed an object to be measured from the collimator lens, and an image sensor for projecting thereon an image of the object produced by the light that has passed through the telecentric lens device.

When the shape measuring apparatus according to the present invention comprises a point light source, the object to be measured can be irradiated with a light beam that is formed as a light beam that is close to an exactly parallel beam to the greatest degree possible by passing through the collimator lens, and the telecentric lens allows passage of only a parallel beam (including a light beam very close to the parallel beam) among light beams that have passed the object. Therefore, even if the object to be measured has a long length in the direction of an optical axis, it is possible to produce a good image of the object having little blurring at an edge of the image at the image sensor. Since the point light source uses a white LED having multi-wavelength components rather than single-wavelength components exhibiting high coherence, even if the object to be measured has a long length in the direction of the optical axis, it is possible to produce a good image of the object having a small number of diffraction fringes near the edge of the image at the image sensor. Therefore, for example, in measuring a two-dimensional shape of an outer peripheral edge of a semiconductor wafer when projecting an image of the object to be measured onto the image sensor by irradiating the object with a parallel beam, even if the object to be measured has a long length in the direction of the optical axis, it is possible to produce a good image of the object having little blurring at the edge of the image at the image sensor and a small number of diffraction fringes near the edge.

Therefore, even if the object to be measured has a long length in the direction of the optical axis, it is possible to produce a good image of the object having little blurring at the edge and a small number of diffraction fringes. Consequently, the edge can be determined with higher precision than in related measuring apparatuses, thereby making it possible to increase the precision of measurement. In addition, since it is possible to produce a good image of the object having a small number of diffraction fringes near the edge, unlike related measuring apparatuses, the load on an image processing system for preventing erroneous detection of the real edge can be reduced, thereby making it possible to prevent a reduction in the precision of measurement and to help prevent an increase in the time required for the measurement.

DESCRIPTION OF THE PREFERRED EMBODIMENT

Hereunder, an embodiment and examples of the present invention will be described in detail with reference to FIGS. 1 to 6B.

Figure 2:
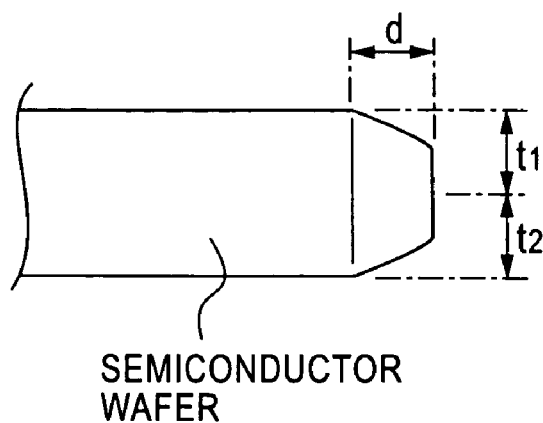
FIG. 2 illustrates a portion of measurement at an external peripheral edge of a semiconductor wafer.

A shape measuring apparatus according to the embodiment is used to measure two-dimensional dimensions (such as a radial length d and thicknesses t1 and t2 of an inclined portion shown in FIG. 2) of an external edge of, for example, a semiconductor wafer having a diameter and a thickness on the order of 300 mm and 0.8 mm, respectively.

Embodiment

Figure 1:
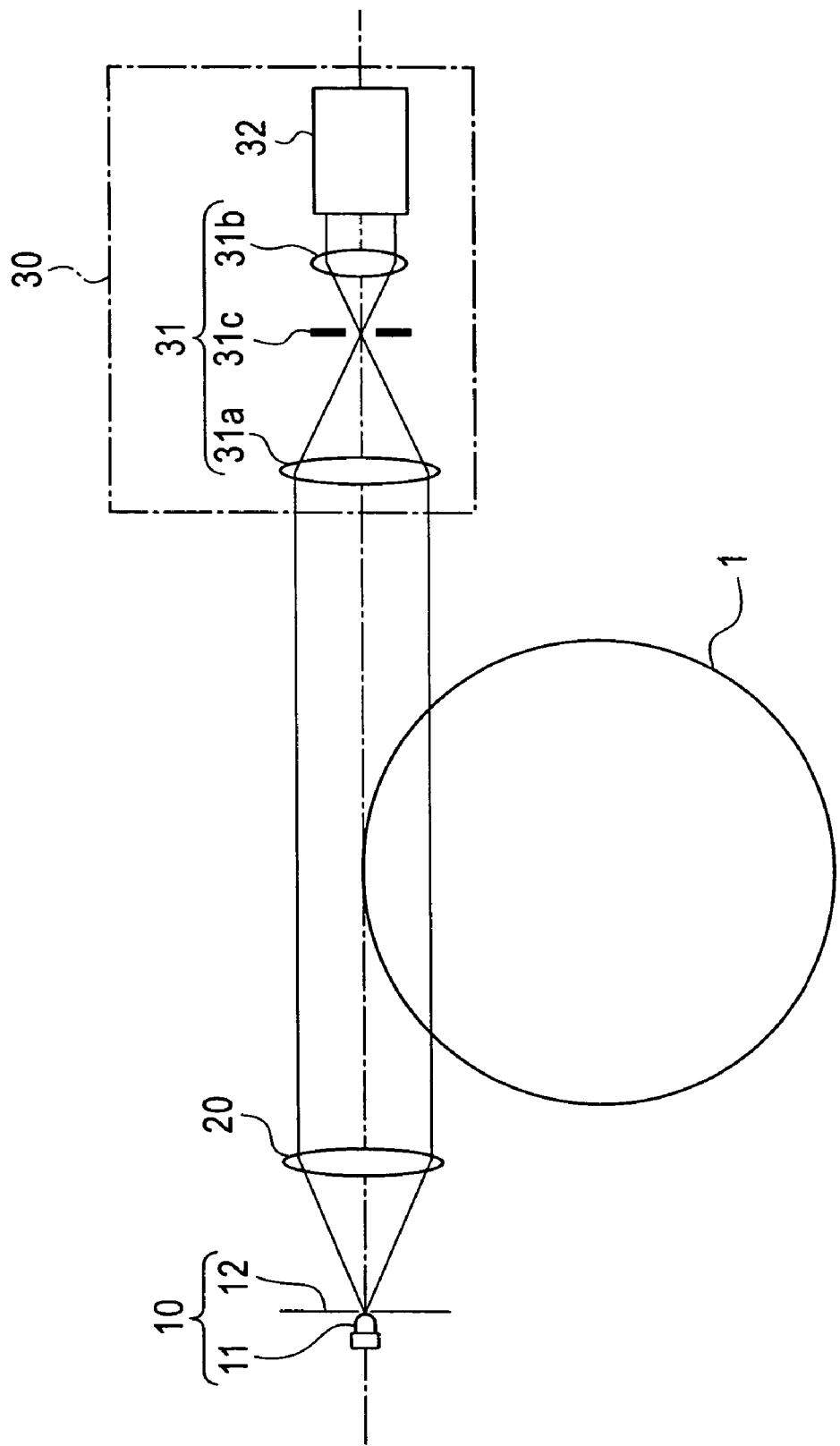
FIG. 1 is a plan view of the structure of a shape measuring apparatus according to an embodiment of the present invention.

Refer to FIG. 1

As shown in FIG. 1, the shape measuring apparatus according to the embodiment comprises a point light source 10, a collimator lens 20 used for parallel optics of the point light source 10, and image pickup optics 30. The point light source 10 has a white LED 11 and a pinhole 12 having an opening which has a size, for example, on the order of φ100 μm to φ200 μm and which is positioned at focal points of the collimator lens 20. Light emitted from the white LED 11 and scattered from the openings impinges upon the collimator lens 20 for forming a parallel beam.

The image pickup optics 30 includes a telecentric lens device 31 and a two-dimensional CCD line sensor 32. Light traveling from the collimator lens 20 passes through the telecentric lens device 31 from a semiconductor wafer 1 serving as an object to be measured and impinges upon the two-dimensional CCD line sensor 32. An image of the semiconductor wafer 1 is projected by using the two-dimensional CCD line sensor 32 serving as an image sensor. In the embodiment, the telecentric lens device 31 includes two-side telecentric optics including a first lens (lens unit) 31a and a second lens (lens unit) 31b. The two lenses 31a and 31b are disposed so that a rear focal point of the lens 31a and a front focal point of the lens 31b coincide, with a variable aperture diaphragm 31c being disposed at this focal point. At an object side (side of the semiconductor wafer 1) and an image side (side of the two-dimensional CCD line sensor 32) of the telecentric lens device 31, a principal ray is parallel to an optical axis. The telecentric lens device 31 passes only a parallel beam (including a beam very close to the parallel beam) among light beams that have passed the semiconductor wafer 1. The distance between the collimator lens 20 and the first lens 31a is, for example, on the order of 200 mm. The semiconductor wafer 1 is disposed between the collimator lens 20 and the first lens 31a.

Instead of the telecentric lens device (two-side telecentric optics) for passing only a parallel beam (including a beam very close to the parallel beam) among the light beams that have passed the semiconductor wafer 1, object-side telecentric optics (object-side telecentric lens device) for forming only a principal light beam at the object side (side of the semiconductor wafer 1) into a light beam parallel to the optical axis may used. When the object-side telecentric lens device is used, in general, an imaging lens is used as the second lens disposed behind the diaphragm.

Accordingly, when the shape measuring apparatus according to the embodiment comprises the point light source 10, the semiconductor wafer 1 (object to be measured) can be irradiated with a light beam that is formed as a light beam close to an exactly parallel beam to the greatest degree possible by passing through the collimator lens 20, and the telecentric lens device 31 can pass only the parallel beam (including a beam very close to the parallel beam) among light beams that have passed the semiconductor wafer 1. Therefore, even if the semiconductor wafer 1 has a long length in the optical axis direction, a good image of the semiconductor wafer 1 having little blurring at an edge of the image at the two-dimensional CCD line sensor 32 can be produced.

In the shape measuring apparatus according to the embodiment, the point light source 10 uses the white LED 11 having multi-wavelength components instead of single-wavelength components having high coherence. Therefore, even if the semiconductor wafer 1 has a long length in the optical axis direction, it is possible to produce a good image of the semiconductor wafer 1 having little blurring at the edge of the image at the two-dimensional CCD line sensor 32 and a small number of diffraction fringes near the edge.

EXAMPLES

Refer to FIG. 3 to FIG. 6B

By using shape measuring apparatuses according to an example and a comparative example, an image of an external edge of a semiconductor wafer having a diameter and a thickness on the order of 300 mm and 0.8 mm, respectively, was set at a two-dimensional CCD line sensor in order to examine edge position information from the image.

In the structure of the shape measuring apparatus according to the example, the point light source used had a white LED (a surface emitting diode having a size of approximately 500 μm), and a pinhole including an opening having a size of φ200 μn. The white LED is one in which the surface of an InGaN blue LED is coated with, for example, YAG:Ce phosphor. This type of white LED produces white light using blue light of the LED and yellow light of the phosphor by exciting the phosphor (which emits yellow light) with the light of the blue LED. For parallel optics for the point light source, a collimator lens having a focal length of f:50 mm was used. For image pickup optics, an object side telecentric lens device having an optical magnification of 2× and a two-dimensional CCD line sensor were used. The object side telecentric lens device had a variable aperture diaphragm at a focal point, with the working distance (from an end of the lens device to an object to be measured) being approximately 100 mm.

In the structure of the shape measuring device of the comparative example, a red LED having a size of approximately φ500 μm was used as the point light source. For parallel optics for the point light source, a collimator lens having a focal length of f:50 mm was used. For image pickup optics, a generally used imaging lens instead of a telecentric lens device and a two-dimensional CCD line sensor were used.

Figure 3:
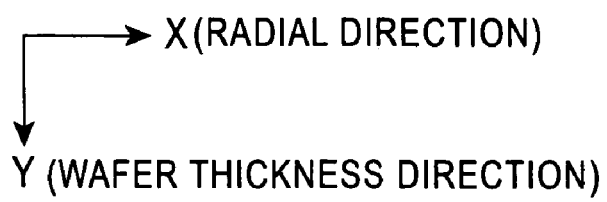
FIG. 3 is a schematic view of an image of the external peripheral edge of the semiconductor wafer produced by the shape measuring apparatus according to an example of the present invention.
Figure 3:
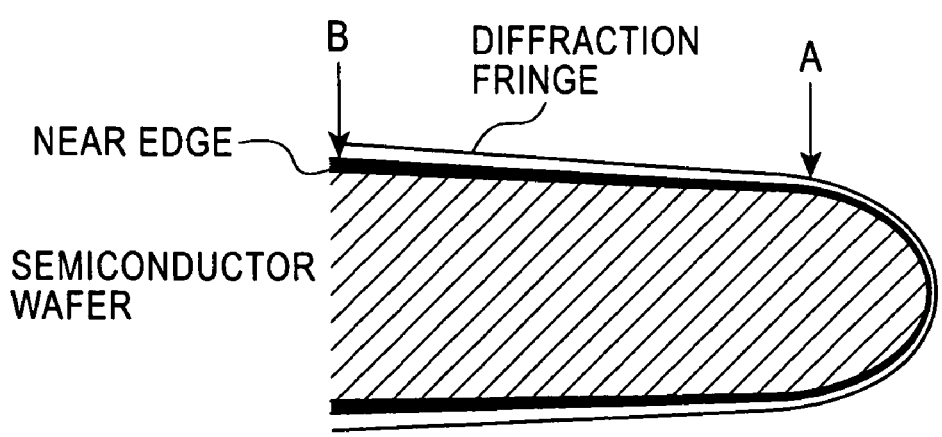
Figure 4A:
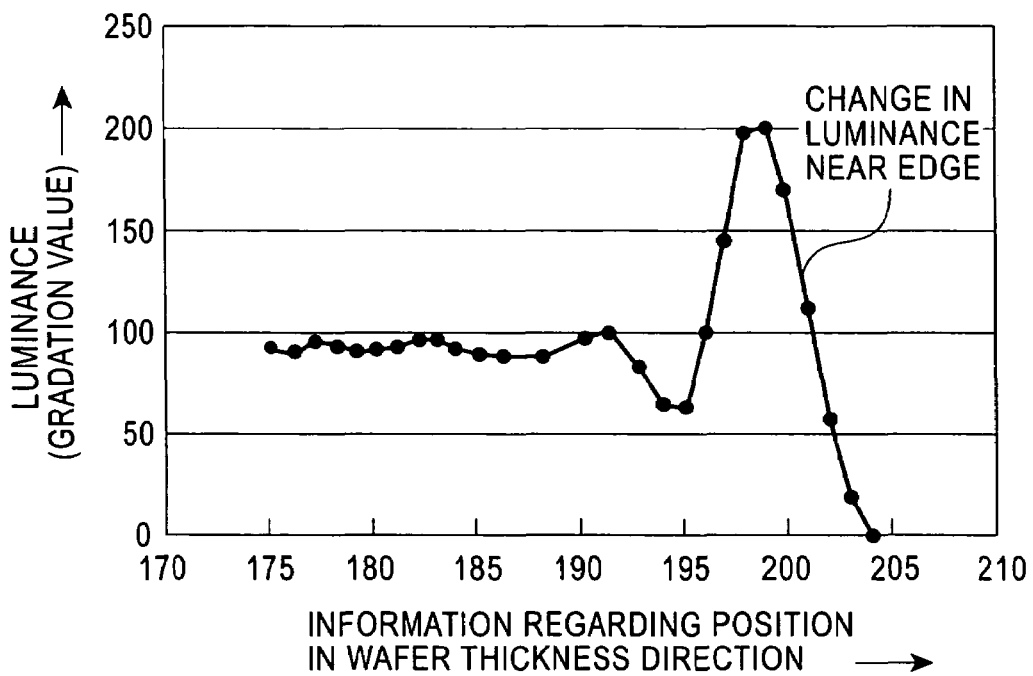
FIG. 4A is a graph showing the relationship between information regarding position in a wafer thickness direction below a tip of an arrow A in FIG. 3 and luminance (gradation value) in the example of the present invention.
Figure 4B:
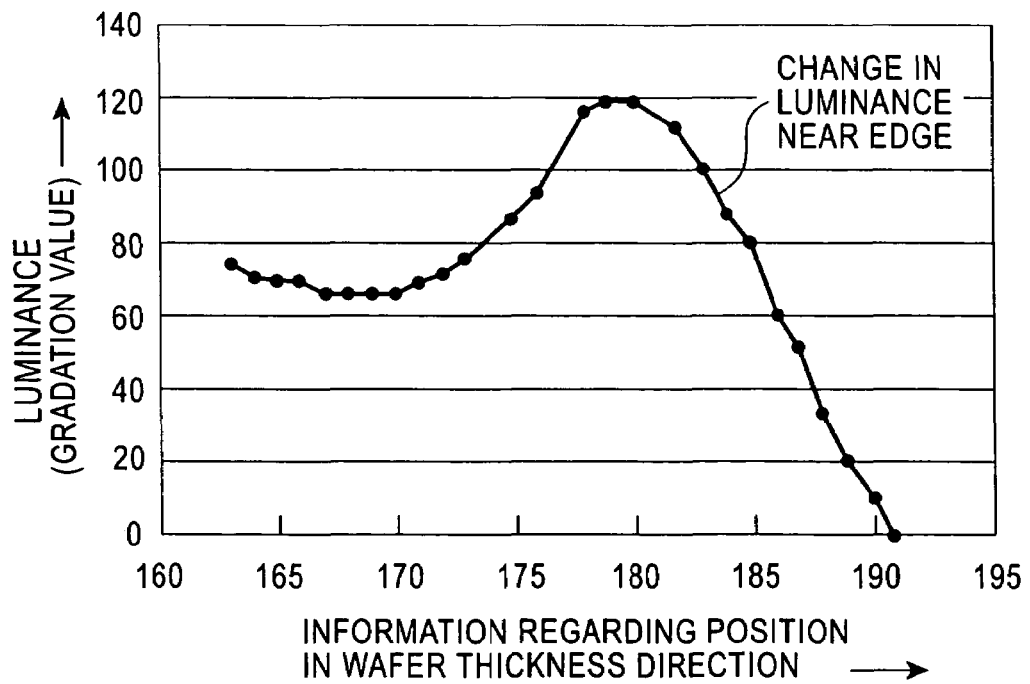
FIG. 4B is a graph showing the relationship between information regarding position in the wafer thickness direction below a tip of an arrow B in FIG. 3 and luminance in the example of the present invention.
Figure 5:
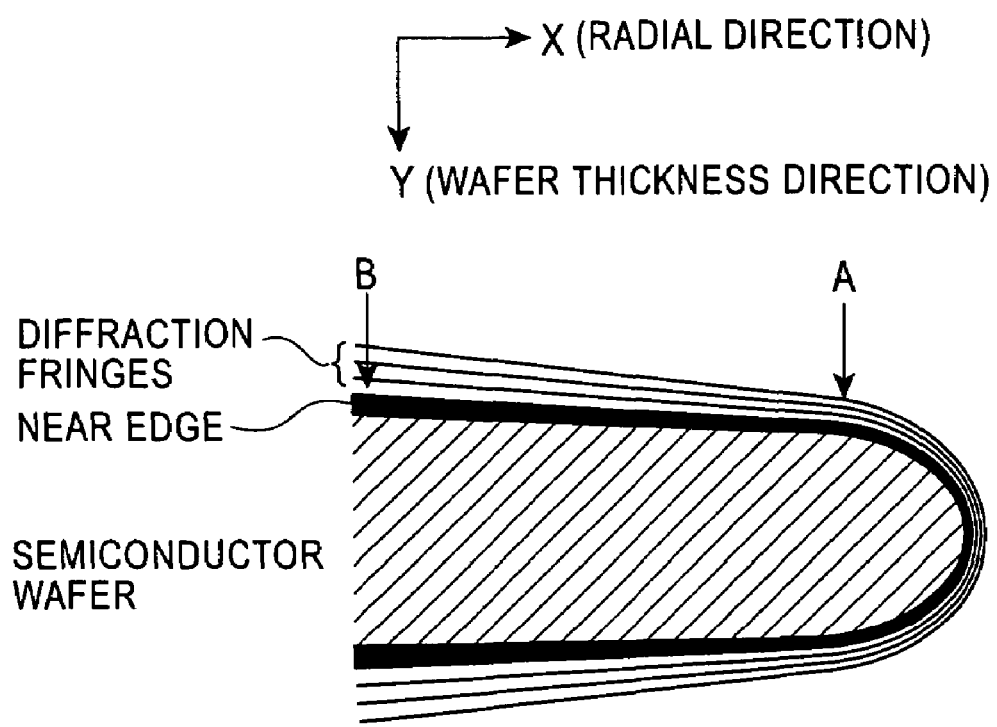
FIG. 5 is a schematic view of an image of an external peripheral edge of a semiconductor wafer produced by a shape measuring apparatus of a comparative example.
Figure 6A:
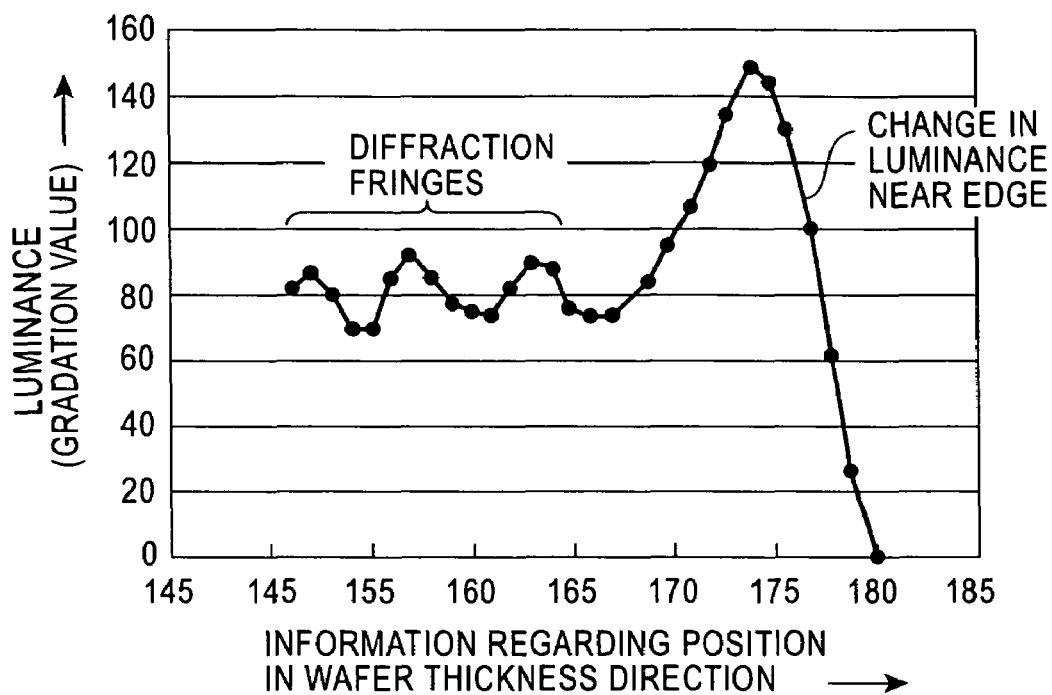
FIG. 6A is a graph showing the relationship between information regarding position in a wafer thickness direction below a tip of an arrow A in FIG. 5 and luminance (gradation value) in the comparative example.
Figure 6B:
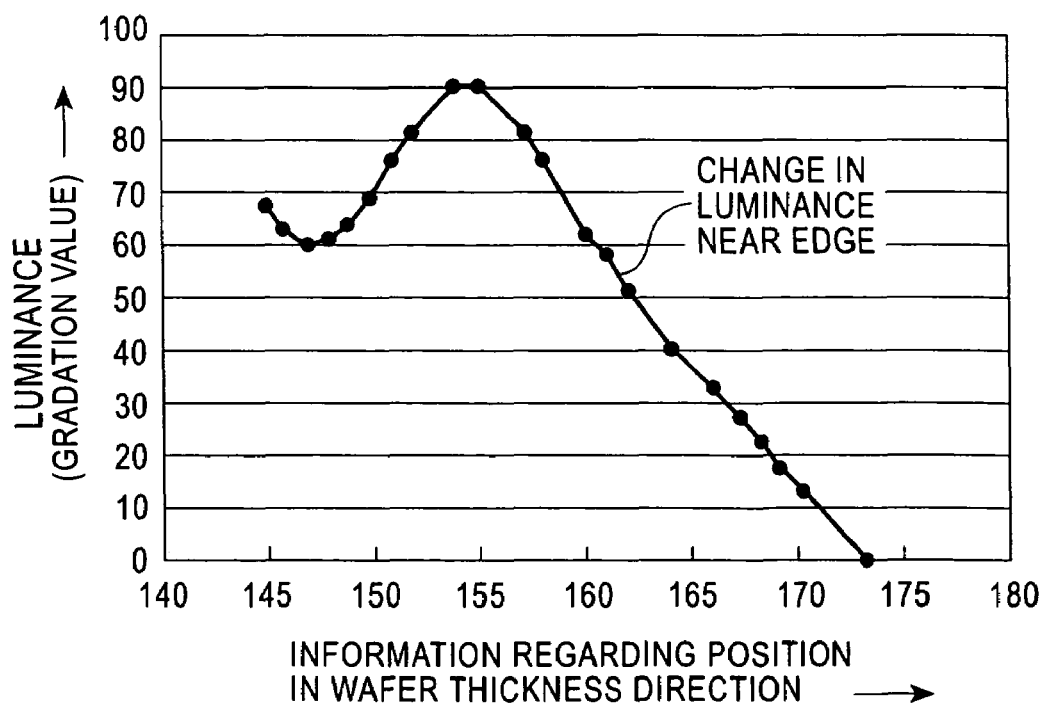
FIG. 6B is a graph showing the relationship between information regarding position in the wafer thickness direction below a tip of an arrow B in FIG. 5 and luminance in the comparative example.

FIG. 3 is a schematic view of an image of the external peripheral edge of the semiconductor wafer produced by the shape measuring apparatus according to the example of the present invention. FIG. 4A is a graph showing the relationship between information regarding position in a wafer thickness direction below a tip of an arrow A in FIG. 3 and luminance (gradation value). FIG. 4B is a graph showing the relationship between information regarding position in the wafer thickness direction below a tip of an arrow B in FIG. 3 and luminance. FIG. 5 is a schematic view of an image of the external peripheral edge of the semiconductor wafer produced by the shape measuring apparatus of the comparative example. FIG. 6A is a graph showing the relationship between information regarding position in a wafer thickness direction below a tip of an arrow A in FIG. 5 and luminance (gradation value) in the comparative example. FIG. 6B is a graph showing the relationship between information regarding position in the wafer thickness direction below a tip of an arrow B in FIG. 5 and luminance.

In each of FIGS. 3 and 5, a hatched portion corresponds to a completely dark portion (where the gradation value is zero) and a portion near an edge (including the real edge) indicated by a black portion corresponds to a portion in which the luminance changes from a bright to dark (that is, the gradation value changes from large to small to zero), and a diffraction fringe or diffraction fringes have a proper luminance.

As shown in FIGS. 5, 6A, and 6B, the image according to the comparative example was considerably blurred at the edge and had a large number of diffraction fringes (FIG. 5 shows only three diffraction fringes produced near the edge, but there were actually additional diffraction fringes at the outer side of these three diffraction fringes).

In contrast, according to the example, as shown in FIG. 3, a good image having little blurring at the edge and a small number of diffraction fringes compared to the comparative example was produced. As can be understood from FIGS. 4A and 4B, the gradient of the luminance at the portion near the edge (including the true edge) was steeper (larger luminance differential value) than in the comparative example, so that a good image having a sharper edge than in the comparative example was obtained.

Accordingly, it was found that the shape measuring apparatus according to the example produced an image having a steep luminance gradient near the edge. Therefore, for example, when the point where the luminance gradient is greatest near the edge is set as the position of the edge by subpixel processing, it is possible to precisely set the position of the edge. Therefore, the dimensions of the external edge of the semiconductor wafer can be more precisely measured two dimensionally. In addition, since a good image of the object having a small number of diffraction fringes near the edge can be produced, a load on an image processing system for carrying out image processing for preventing erroneous detection of a real edge by separating the large number of diffraction fringes can be reduced. Therefore, it is possible to prevent a reduction in the precision of measurement and help prevent an increase in the time required for measurement.

What is claimed is:

1. A shape measuring apparatus comprising:
    a point light source including a white light-emitting diode;
    a collimator lens for forming a parallel beam as a result of causing light emitted from the point light source to be incident upon the collimator lens, said collimator lens being configured to direct the parallel beam at an external edge of a semiconductor wafer, an optical axis of the parallel beam being parallel to a face of the semiconductor wafer, the semiconductor wafer having a length longer than a thickness of the semiconductor wafer in a direction of the optical axis of the parallel beam;
    a telecentric lens device, including two-side telecentric optics or object-side telecentric optics, for being irradiated with the light of the parallel beam that has passed the external edge of the semiconductor wafer to be measured from the collimator lens; and
    an image sensor for directly receiving thereon a two-dimensional image of the external edge of the semiconductor wafer produced by the light of the parallel beam that has passed through the telecentric lens device,
    wherein the light that has passed through the telecentric lens is not split before being received by the image sensor.

2. The shape measuring apparatus according to claim 1, wherein the point light source has a pinhole in addition to the white light-emitting diode.

\* \* \* \* \*